(12) United States Patent  
Ozaki

(10) Patent No.: US 12,358,313 B2  
(45) Date of Patent: Jul. 15, 2025

(54) PROCESSING DEVICE AND RECORDING DEVICE

(71) Applicant: SEIKO EPSON CORPORATION, Tokyo (JP)

(72) Inventor: Tsutomu Ozaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 17/447,634

(22) Filed: Sep. 14, 2021

(65) Prior Publication Data

US 2022/0176721 A1 Jun. 9, 2022

(30) Foreign Application Priority Data

Dec. 8, 2020 (JP) ................................. 2020-203586

(51) Int. Cl.
*B41J 29/393* (2006.01)

(52) U.S. Cl.
CPC .................................. *B41J 29/393* (2013.01)

(58) Field of Classification Search
None
See application file for complete search history.

(56) References Cited

U.S. PATENT DOCUMENTS

| 2006/0092194 | A1* | 5/2006 | Yamaguchi | H04N 1/0053 347/2 |
| 2008/0012771 | A1* | 1/2008 | Watanabe | H01Q 1/12 343/700 MS |
| 2011/0181903 | A1* | 7/2011 | Katsuyama | H04N 1/0035 358/1.14 |
| 2014/0132652 | A1* | 5/2014 | Nakamura | H01Q 7/00 347/1 |
| 2016/0267456 | A1 | 9/2016 | Serizawa et al. | |
| 2019/0124221 | A1* | 4/2019 | Lo | H04N 1/00392 |
| 2021/0359401 | A1* | 11/2021 | Bae | H01Q 1/12 |

FOREIGN PATENT DOCUMENTS

JP 2016-167232 A 9/2016

* cited by examiner

*Primary Examiner* — Alejandro Valencia
(74) *Attorney, Agent, or Firm* — WORKMAN NYDEGGER

(57) ABSTRACT

A housing, a processing unit disposed inside the housing, a cover member for covering an opening located in the housing in an openable and closeable manner, and a near field communication sensor disposed in the housing are provided, the processing unit is exposed to an exterior of the housing through the opening, and the near field communication sensor is, with the opening closed by the cover member, located between the opening surface and the cover member in an orthogonal direction orthogonal to an opening surface of the opening.

7 Claims, 8 Drawing Sheets

PROCESSING DEVICE AND RECORDING DEVICE

The present application is based on, and claims priority from JP Application Serial Number 2020-203586, filed Dec. 8, 2020, the disclosure of which is hereby incorporated by reference herein in its entirety.

BACKGROUND

1. Technical Field

The present disclosure relates to a processing device and a recording device.

2. Related Art

For example, as in JP 2016-167232 A, there is a printer that is an example of a processing device and a recording device. The printer includes a housing, and an NFC antenna, which is an example of a near field communication sensor. The NFC antenna is disposed in the housing.

For example, the installation of the near field communication sensor in the housing may also be accomplished by providing an installation space for the near field communication sensor at an outer surface of the housing, and installing the near field communication sensor in the installation space. In this case, increasing the installation space for the near field communication sensor on the outer surface of the housing affects an appearance of the housing. Improvements have been desired for the installation aspect of the near field communication sensor in the housing to mitigate the impact on the appearance of the housing.

SUMMARY

A processing device for solving the above-described problem includes a housing, a processing unit disposed inside the housing, a cover member configured to cover an opening located in the housing in an openable and closeable manner, and a near field communication sensor disposed in the housing, wherein the processing unit is exposed to an exterior of the housing through the opening, and the near field communication sensor is, with the opening closed by the cover member, located between the opening surface and the cover member in an orthogonal direction orthogonal to an opening surface of the opening.

A recording device for solving the above-described problem includes a housing, a recording head configured to perform scanning in a scanning direction different from a transport direction of a recording medium to perform recording, a maintenance member disposed inside the housing, and used for maintenance of the recording head, a cover member configured to cover an opening located in the housing in an openable and closeable manner, and a near field communication sensor disposed in the housing, wherein the maintenance member is exposed to an exterior of the housing through the opening, and the near field communication sensor is, with the opening closed by the cover member located between the opening surface and the cover member in an orthogonal direction orthogonal to an opening surface of the opening.

DESCRIPTION OF EXEMPLARY EMBODIMENTS

Figure 1:
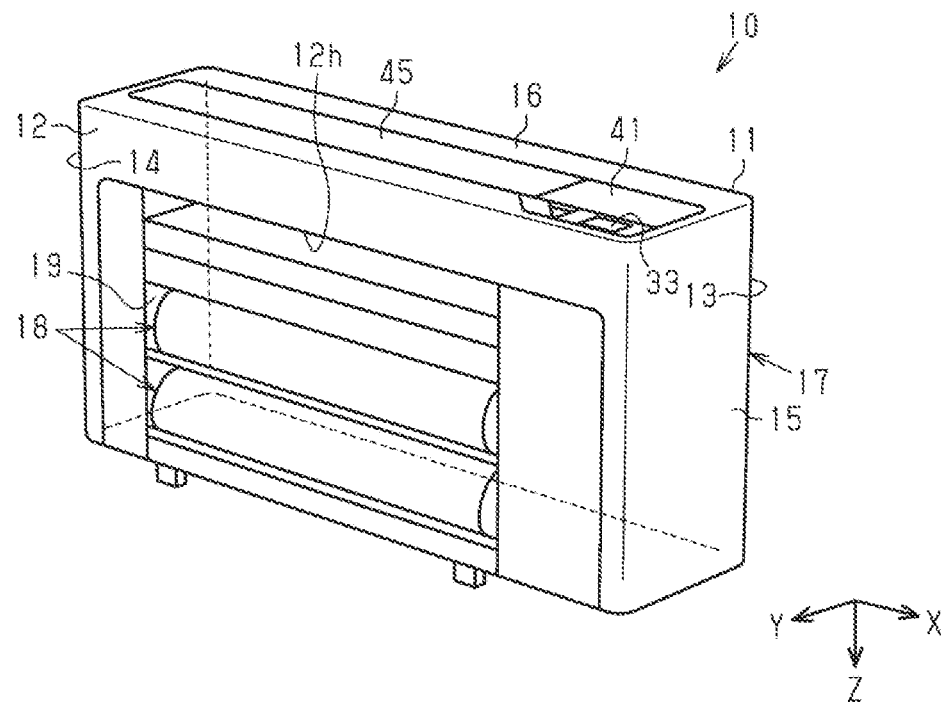
FIG. 1 is a perspective view illustrating a recording device according to an exemplary embodiment.

One exemplary embodiment of a recording device as an example of a processing device will be described below with reference to the accompanying drawings. The recording device according to the present exemplary embodiment is, for example, an ink jet-type printer configured to discharge ink, which is an example of liquid, onto a medium such as paper, to perform printing.

In the drawings, a direction of gravity is indicated by a Z-axis while assuming that the recording device is placed on a horizontal surface, and directions along the horizontal surface are indicated by an X-axis and a Y-axis. The X-, Y-, and Z-axes are orthogonal to each other. In the following description, a direction parallel to the X-axis is also referred to as a width direction X, and a direction parallel to the Y-axis is also referred to as a depth direction Y, and a direction parallel to the Z-axis is also referred to as a vertical direction Z.

As illustrated in FIG. 1, a recording device 10, which is an example of the processing device, includes a housing 11. The housing 11 has a substantially rectangular shape. The housing 11 includes an upper wall 16 and a side wall 17. The side wall 17 includes a front wall 12, a rear wall 13, a first side wall 14, and a second side wall 15. The front wall 12 is located farther in the depth direction Y than the rear wall 13. The second side wall 15 is located farther in the width direction X than the first side wall 14. The second side wall 15 is coupled to an end portion of each of the front wall 12 and the rear wall 13 in the width direction X. The first side wall 14 is coupled to an end portion of each of the front wall 12 and the rear wall 13 in a direction opposite the width direction X. The upper wall 16 is coupled to an upper end of each of the front wall 12, the rear wall 13, the first side wall 14, and the second side wall 15. The upper wall 16 may extend parallel to the horizontal surface.

Figure 2:
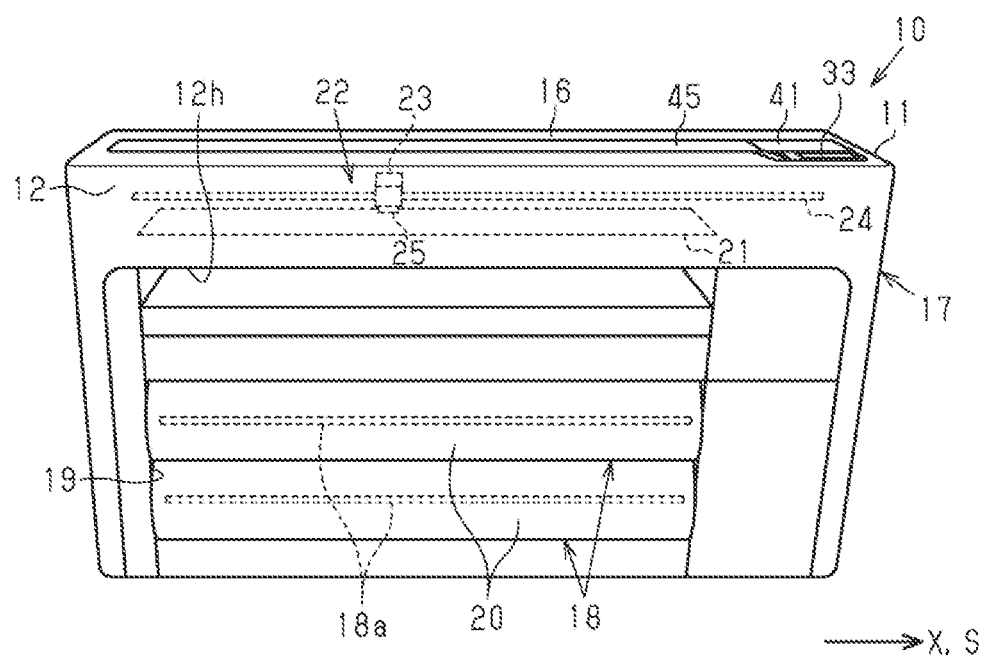
FIG. 2 is a schematic view illustrating the recording device.

As illustrated in FIG. 2, the recording device 10 may include an installation unit 19 on which a cylindrical roll body 18 can be installed. The roll body 18 is formed by winding a recording medium 20 around a core member 18*a*. A plurality of the roll bodies 18 can be installed on the installation unit 19. Both ends of each roll body 18 in the width direction X are rotatably mounted on holding units (not illustrated) of the installation unit 19 respectively. The installation unit 19 opens in a part in the vertical direction Z of the front wall 12 of the housing 11. The installation unit 19 configures a part of an internal space of the housing 11 in the vertical direction Z.

The recording device 10 may include a plate-like support 21 inside the housing 11. The support 21 is located above the installation unit 19. A dimension in the width direction X of the support 21 is greater than a dimension in the width direction X of the recording medium 20. The support 21 can support the recording medium 20 on an upper surface thereof.

Figure 3:
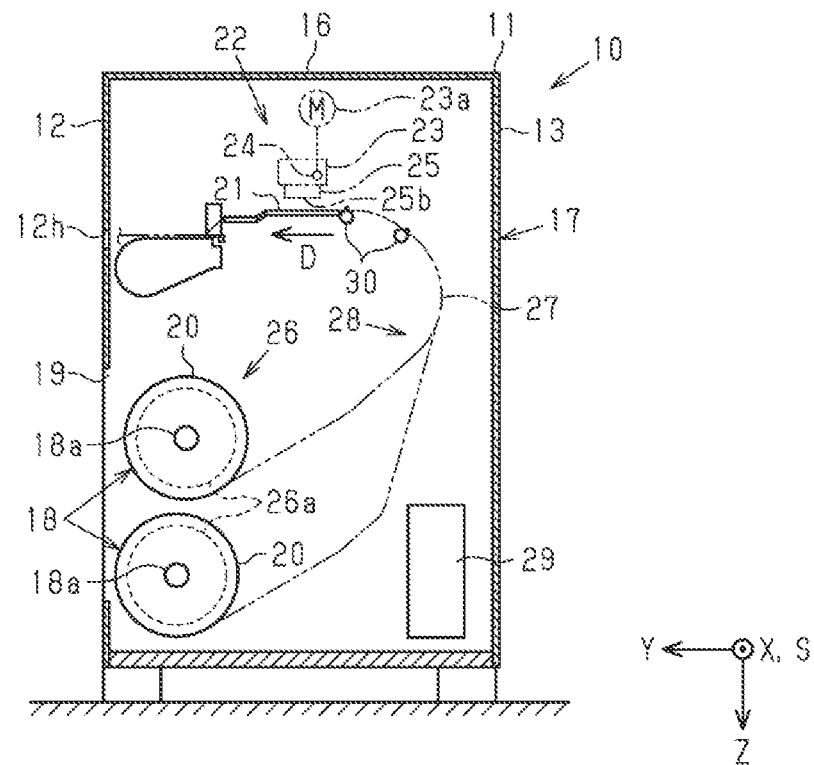
FIG. 3 is a cross-sectional view of the recording device.

As illustrated in FIG. 3, the recording device 10 may include a feeding unit 26 for feeding the recording medium 20, a transport unit 28 for transporting the recording medium 20 along a transport path 27 illustrated by a two-dot chain line in the figure, and a control unit 29. The housing 11 accommodates a transport path 27. The transport path 27 may include an upside of the support 21. The transport path 27 is coupled to a discharge port 12h that opens in the front wall 12.

The feeding unit 26 rotates the roll body 18 by driving of a drive motor 26a. As the roll body 18 rotates, the recording medium 20 is unwound from the roll body 18 and fed to the transport path 27.

The transport unit 28 may be provided with a plurality of transport roller pairs 30. The transport roller pair 30 rotates while sandwiching the recording medium 20, thereby transporting the recording medium 20 in a transport direction D on the transport path 27. The transport direction D is a direction along the transport path 27.

The control unit 29 may control various operations performed in the recording device 10. The control unit 29 can be constituted as α: one or more processors performing various types of processing in accordance with a computer program, β: one or more dedicated hardware circuits such as an application specific integrated circuit for performing at least some of the various types of processing, or γ: a circuit including a combination thereof. The processor includes a CPU and memories such as a RAM and a ROM, and the memory is configured to store a program code or a command configured to cause the CPU to execute the processing. The memory, or a computer readable medium includes any readable medium accessible by a general purpose or special purpose computer.

Recording Unit 22

As illustrated in FIG. 3, the recording device 10 includes a recording unit 22, which is an example of a processing unit. The recording unit 22 is disposed inside the housing 11. The recording unit 22 may include a carriage 23 that moves in a scanning direction S, a rod-like guide shaft 24 extending in the width direction X, and a carriage motor 23a. The scanning direction S may be a direction parallel to the X-axis. The carriage 23 is supported by the guide shaft 24. The carriage 23 can reciprocate along the guide shaft 24 when the carriage motor 23a is driven. The carriage 23 and the guide shaft 24 are located spaced upward the support 21.

Recording Head 31

Figure 4:
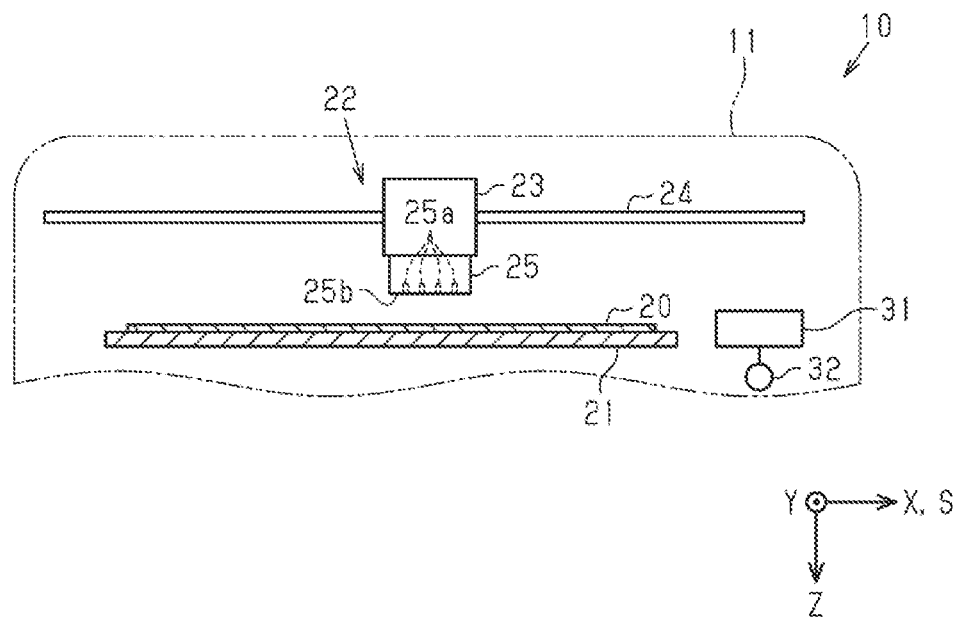
FIG. 4 is a schematic view illustrating the recording device.

As illustrated in FIG. 4, the recording unit 22 includes a recording head 25 for performing recording on the recording medium 20. In other words, the recording device 10 includes the recording head 25. The recording head 25 has a nozzle surface 25b in which a nozzle 25a opens.

On the carriage 23, the recording head 25 is mounted. The recording head 25 moves with the carriage 23 to perform scanning in the scanning direction S. The recording head 25 moves to positions above the support 21 and away from the support 21. The nozzle surface 25b may be parallel to an upper surface of the support 21. The recording head 25 may discharge liquid from the nozzle 25a onto the recording medium 20 on the support 21 to perform recording on the recording medium 20.

Note that, the transport direction D of the transport path 27 on the support 21 is parallel to the Y-axis. The scanning direction S of the recording head 25 is parallel to the X-axis. Therefore, the recording head 25 can be said to perform scanning in a direction different from the transport direction D of the recording medium 20 to perform recording.

Cap 31

As illustrated in FIG. 4, the recording device 10 includes a cap 31, which is an example of a maintenance member. The cap 31 is disposed inside the housing 11. The cap 31 may be capable of reciprocating along the Z-axis by a cap motor 32. As the cap motor 32 drives, the cap 31 moves between a separate position, which is a lower position, and a contact location, which is an upper position. When the cap 31 is at the contact position, the cap 31 contacts the recording head 25 that is stopped at a cap position. The cap position is a position of an end portion of a scanning region of the recording head 25 in the scanning direction S.

The cap 31 is used for maintenance of the recording head 25. The cap 31 covers the nozzle surface 25b to enclose an opening of the nozzle 25a of the recording head 25. In this manner, the maintenance in which the cap 31 encloses the opening of the nozzle 25a is referred to as capping. By the capping, drying of the nozzle 25a is suppressed. The cap 31 may be configured to collectively enclose all the nozzles 25a that open in the nozzle surface 25b.

Operating Unit 33

Figure 5:
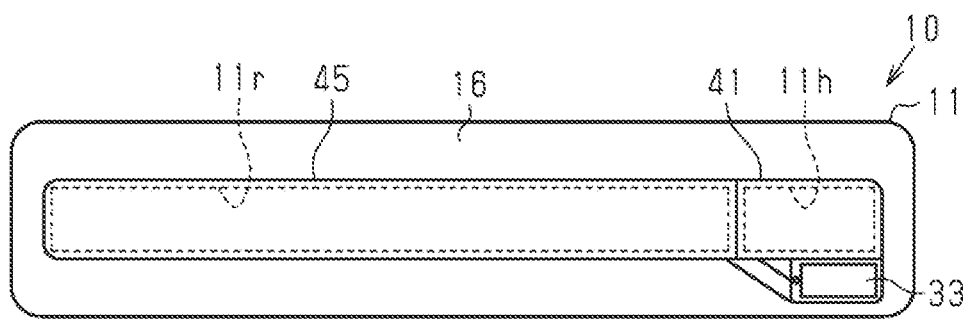
FIG. 5 is a top view of the recording device.

As illustrated in FIG. 5, the recording device 10 may include an operating unit 33 operated by a user. The operating unit 33 may be configured, for example, by a touch panel or the like, and may be used when the user inputs various types of information. The input of various types of information into the operating unit 33 may be performed by the user touching various menus displayed on the operation unit 33. Based on the input to the operating unit 33 by the user, the control unit 29 may control movement and stop of the recording head 25 by controlling driving of the carriage motor 23a.

The operating unit 33 is disposed inside the housing 11. The operating unit 33 may be disposed on the upper wall 16 of the housing 11. The operating unit 33 may be disposed shifted in the width direction X from a center portion of the housing 11 in the width direction X.

Cover Member 41 and Opening 11h

As illustrated in FIG. 5, the recording device 10 includes a cover member 41 that covers the opening 11h located in the housing 11 in an openable and closeable manner. The cover member 41 and the opening 11h may be disposed on the upper wall 16 of the housing 11. The cover member 41 and the opening 11h may be disposed at respective positions biased in the width direction X from the center portion of the upper wall 16 in the width direction X. The operating unit 33 may be aligned with the cover member 41 and the opening 11h in the depth direction Y.

A virtual plane having an opening edge of the housing 11 as a periphery is referred to as an opening surface of the opening 11h. The opening surface of the opening 11h may be a horizontal surface orthogonal to the vertical direction Z. The cover member 41 may have a flat plate shape that extends along the opening surface of the opening 11h.

The housing 11 may include a large opening 11r that is greater than the opening 11h, and a large cover 45 that covers the large opening 11r. The opening 11h and the cover member 41 may be disposed on the upper wall 16 in the width direction X so as to be aligned with the large opening 11r and the large cover 45.

Figure 6:
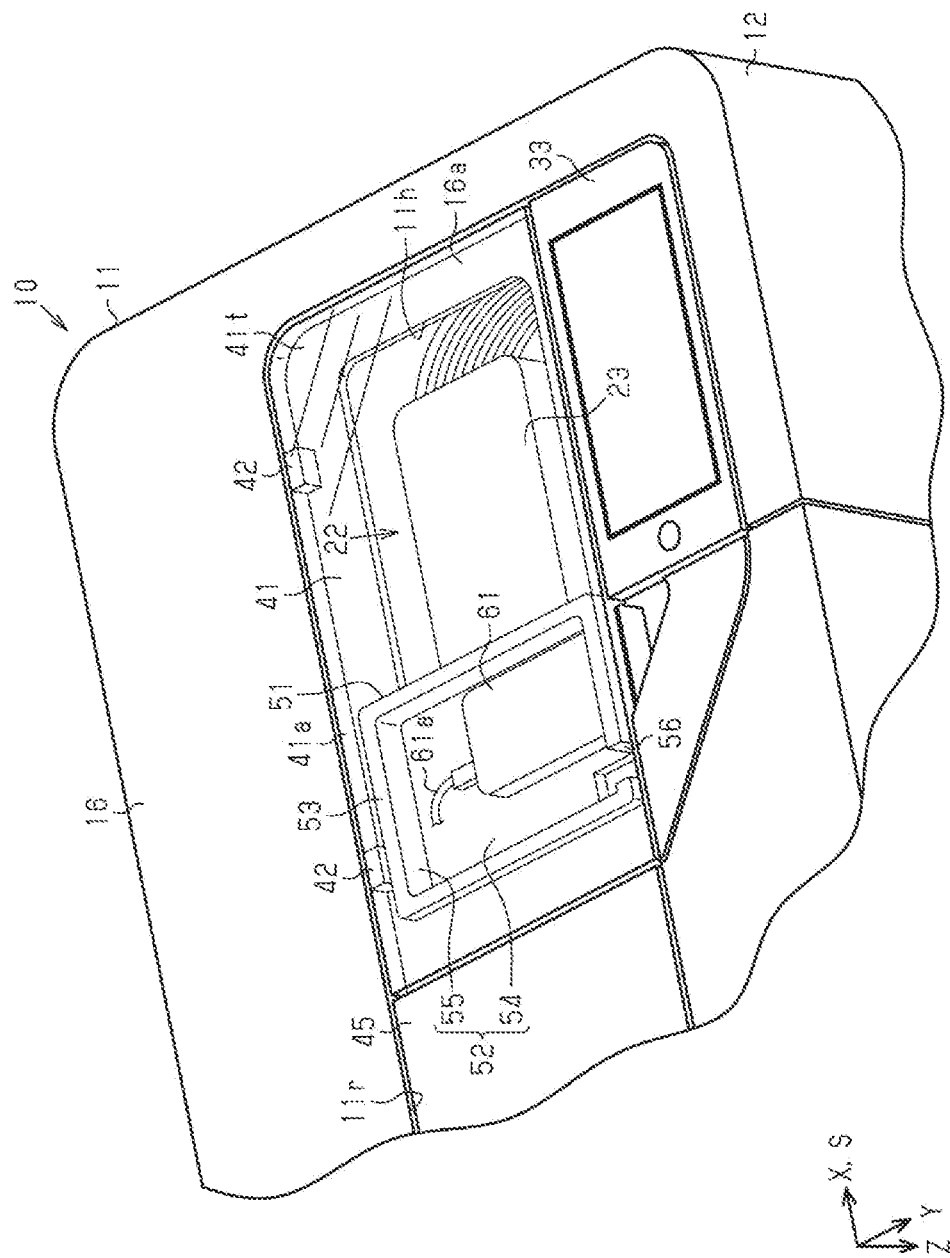
FIG. 6 is a perspective view illustrating the recording device when a cover member is at a closing position.

As illustrated in FIG. 6, the cover member 41 may be transmissive. The cover member 41 may include a support portion 42 that supports the cover member 41 on the upper wall 16. The two support portions 42 are located along a cover end portion 41a as an end portion of the cover member 41. The support portion 42 supports the cover member 41 so as to be rotatable relative to the housing 11, about a rotary shaft that extends parallel to the cover end portion 41a. That is, the cover member 41 may be rotationally movable with the cover end portion 41a of the cover member 41 as a rotation axis. The cover member 41 may rotationally move to be movable to an opening position for opening the opening 11h and to a closing position for closing the opening 11h. Note that, a configuration may be adopted in which the cover member 41 can move to the opening position when the large cover 45 is at the opening position since a part of the cover member 41 overlaps the large cover 45, or the like.

Figure 7:
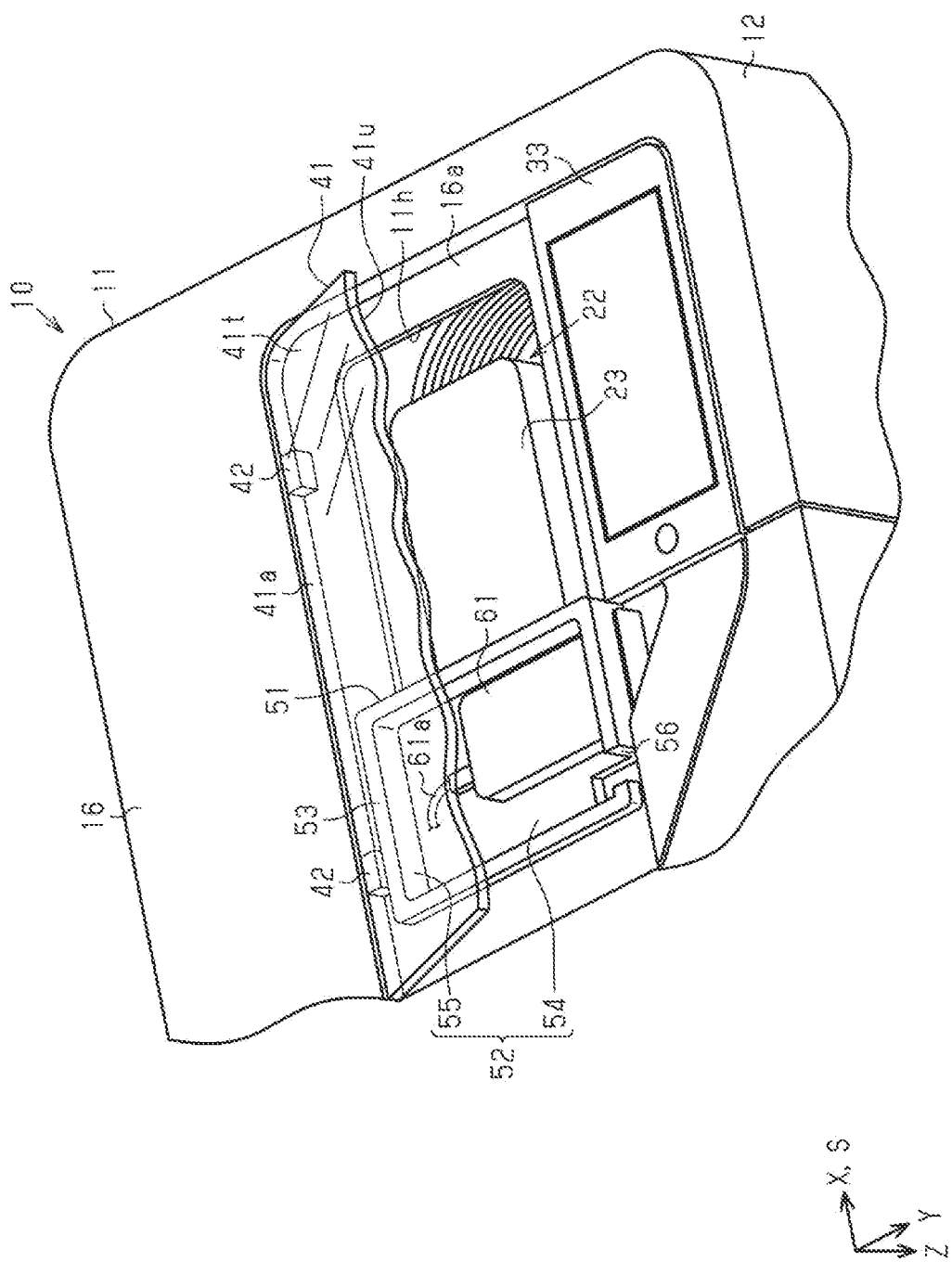
FIG. 7 is a perspective view illustrating the recording device when the cover member is at an opening position.

As illustrated in FIG. 7, a portion of the upper wall 16 that constitutes the opening 11h and is located around the opening 11h is referred to as a peripheral wall portion 16a. The peripheral wall portion 16a is located farther in the vertical direction Z than a portion of the upper wall 16 other than the peripheral wall portion 16a. A surface of the cover member 41 facing the opening 11h is referred to as a cover inner surface 41u, and a surface of the cover member 41 opposite to the cover inner surface 41u is referred to as a cover outer surface 41t. The cover outer surface 41t of the cover member 41 may be flush with a surface of a portion of the upper wall 16 other than the peripheral wall portion 16a. The cover inner surface 41u of the cover member 41 may be spaced apart from the peripheral wall portion 16a.

The recording unit 22 is exposed to an exterior of the housing 11 through the opening 11h of the upper wall 16. More specifically, when the recording head 25 in the recording unit 22 is at the cap position, the carriage 23 is exposed to the exterior of the housing 11 through the opening 11h. Also, when the recording head 25 moves from the cap position and the recording head 25 is no longer located above the cap 31, the cap 31 is exposed to the exterior of the housing 11 through the opening 11h.

Tray Member 51

As illustrated in FIG. 7, the recording device 10 may include a tray member 51 that overlaps the opening 11h from outside the housing 11. The tray member 51 may be disposed on the housing 11 in a detachable manner. Attachment to the housing 11 and removal from the housing 11 of the tray member 51 may be performed by the user.

The tray member 51 may be located above the recording head 25 and the cap 31. The recording head 25 is movable in the scanning direction S by passing below the tray member 51. The tray member 51 overlaps a part of the opening 11h in a direction opposite the width direction X. When the tray member 51 is attached to the housing 11, and the tray member 51 overlaps a part of the opening 11h, the carriage 23 is exposed to the exterior of the housing 11 via a part of the opening 11h not overlapping the tray member 51. Note that, the tray member 51 may overlap the entire opening 11h.

Figure 8:
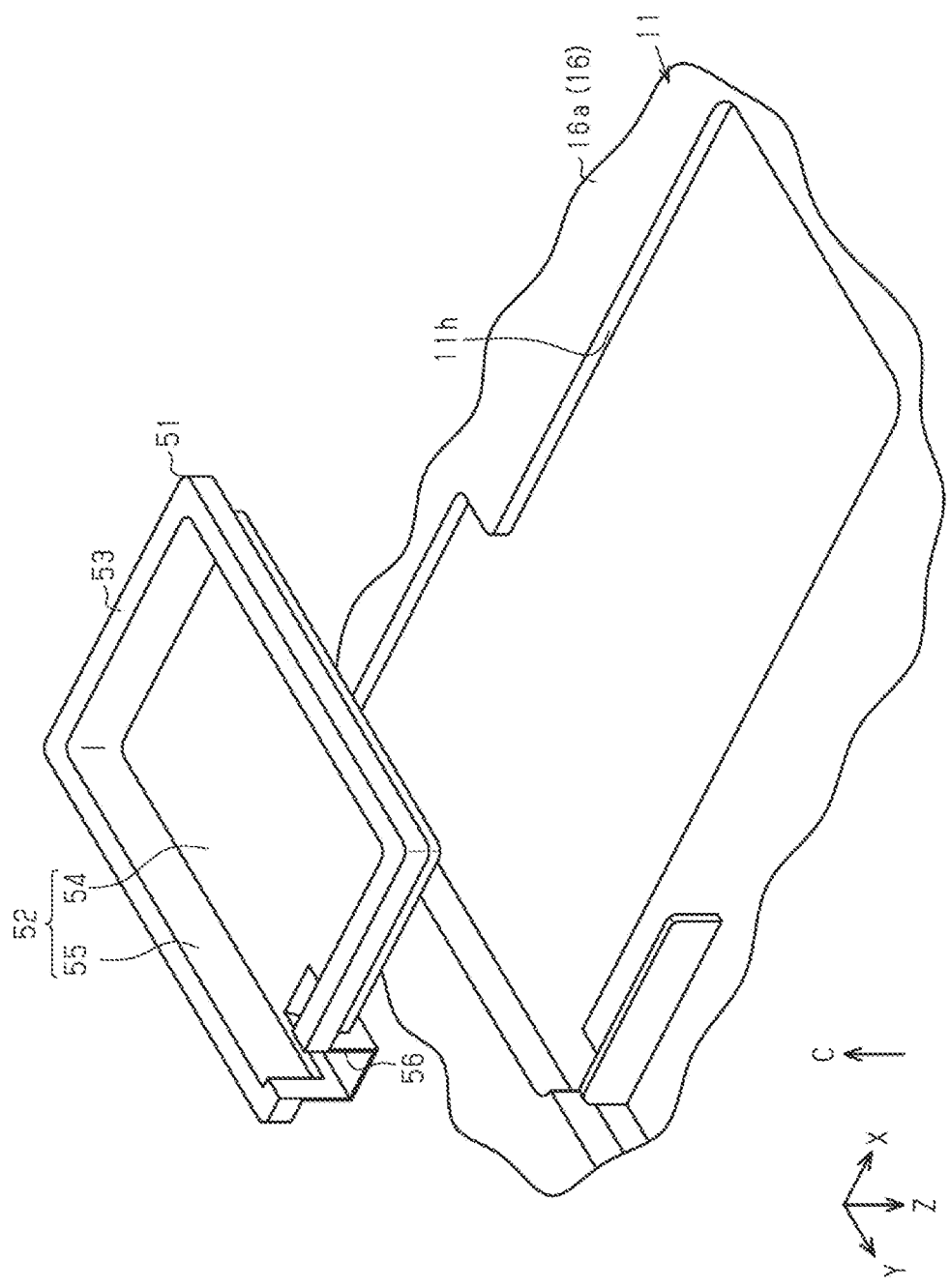
FIG. 8 is a perspective view illustrating a housing and a tray member.

As illustrated in FIG. 8, the tray member 51 may include a substantially rectangular box-shaped accommodation portion 52 that opens upward, and a protruding portion 53 that protrudes from an opening end of the accommodation portion 52. The accommodation portion 52 includes a substantially rectangular bottom wall 54, and an extended wall 55 extending upward from a periphery of the bottom wall 54. The tray member 51 may include a notch 56 obtained by cutting a part of each of the extended wall 55 and the protruding portion 53. The notch 56 is located at an end portion of the tray member 51 in the depth direction Y, with the tray member 51 attached to the upper wall 16 of the housing 11.

When the tray member 51 is attached to the upper wall 16 of the housing 11, the protruding portion 53 is disposed on the upper wall 16 around the opening 11h, and the bottom wall 54 of the accommodation portion 52 is located below the opening surface of the opening 11h. As a result, a lower portion of the accommodation portion 52 including the bottom wall 54 is located below the opening surface of the opening 11h, in an orthogonal direction C orthogonal to the opening surface of the opening 11h. An upper portion of the accommodation portion 52 including the opening end of the accommodation portion 52, and the protruding portion 53 are located between the opening surface of the opening 11h and the cover member 41 in the orthogonal direction C. Note that, the orthogonal direction C may be a direction parallel to the Z-axis direction.

Near Field Communication Sensor 61

As illustrated in FIG. 7, the recording device 10 includes a near field communication sensor 61 disposed in the housing 11. The near field communication sensor 61 is a sensor capable of communicating with a communication terminal via Near Field Communication (NFC). By the user moving the communication terminal closer to the near field communication sensor 61, the control unit 29 can receive various data from the communication terminal, and transmit various data to the communication terminal via the near field communication sensor 61.

The near field communication sensor 61 may be disposed on the tray member 51, thereby disposed in the housing 11 via the tray member 51. The near field communication sensor 61 disposed on the tray member 51 is accommodated in the accommodation portion 52 of the tray member 51, and is disposed on the bottom wall 54. With the near field communication sensor 61 disposed on the tray member 51, attachment of the tray member 51 to the upper wall 16 of the housing 11, and removal of the tray member 51 from the upper wall 16 are possible. After attaching the tray member 51 to the upper wall 16 of the housing 11, attachment to and removal from the upper wall 16 such as disposition of the near field communication sensor 61 on the tray member 51, can be separately performed for the tray member 51 and the near field communication sensor 61.

By disposing the near field communication sensor 61 on the tray member 51, the near field communication sensor 61 is located between the opening surface of the opening 11h and the cover member 41 in the orthogonal direction C, with the cover member 41 closing the opening 11h. By the cover member 41 being transmissive, the near field communication sensor 61 may be visible to the user with the cover member 41 closing the opening 11h.

The near field communication sensor 61 may include wiring 61a extending from the near field communication sensor 61. The wiring 61a may extend from the near field communication sensor 61 toward the cover end portion 41a of the cover member 41. The wiring 61a may be coupled to the control unit 29, for example. Various data may be transmitted and received between the near field communication sensor 61 and the control unit 29 via the wiring 61a. The wiring 61a may be coupled to the control unit 29 through the notch 56 of the tray member 51.

Positional Relationship Between Near Field Communication Sensor 61 and Operating Unit 33

Figure 9:
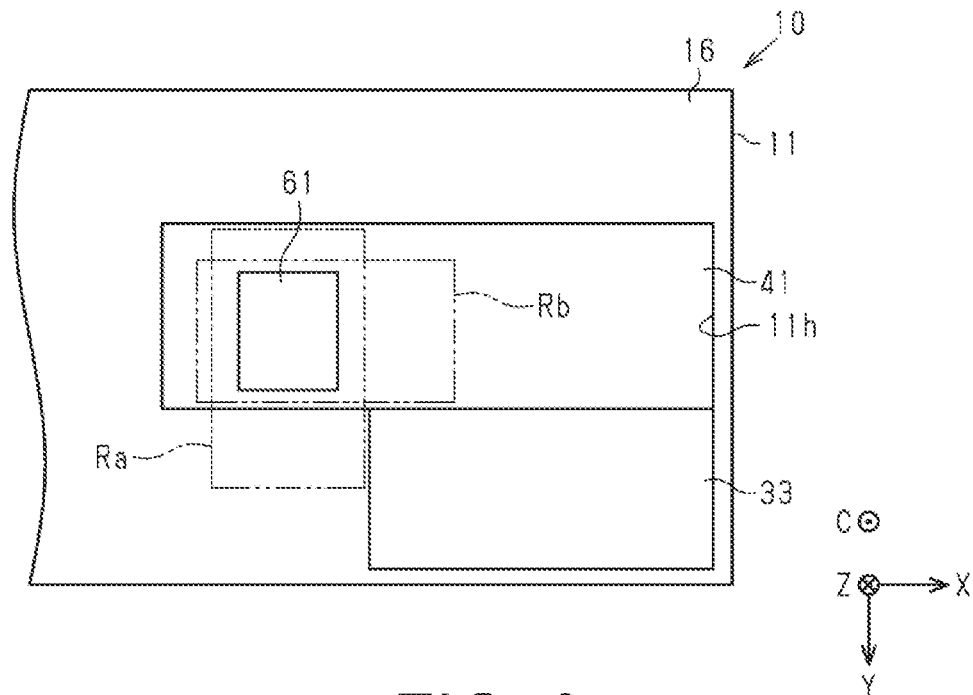
FIG. 9 is a schematic view for explaining a positional relationship between an operating unit and a near field communication sensor.

As illustrated in FIG. 9, the near field communication sensor 61 may be surrounded by the upper wall 16. Similar to the disposition of the opening 11h on the housing 11, the near field communication sensor 61 may be disposed shifted in the width direction X from a center portion of the housing 11 in width direction X. Note that, the operating unit 33 is also disposed shifted in the width direction X from the center portion of the housing 11 in the width direction X. The operating unit 33 is not aligned with the near field communication sensor 61 in any direction of the width direction X different from the orthogonal direction C, and the depth direction Y different from the orthogonal direction C and the width direction X.

Actions of Present Exemplary Embodiment

Next, actions of the present exemplary embodiment will be described.

As illustrated in FIG. 9, the opening 11h in the upper wall 16 of the housing 11 is used by the user to maintain the recording head 25 through the opening 11h, and can be used as a disposition space for the near field communication sensor 61.

The user may hold the communication terminal over the near field communication sensor 61, with the cover member 41 closing the opening 11h. FIG. 9 illustrates a disposition region of the communication terminal by a two-dot chain line. For example, the communication terminal can be disposed on a surface of the upper wall 16 that includes a part farther in the depth direction Y than the cover member 41, as indicated by a first disposition region Ra. For example, the communication terminal can be disposed on the cover outer surface 41t of the cover member 41 that includes a part farther in the width direction X than an upside of the near field communication sensor 61, as indicated by a second disposition region Rb.

Effects of Present Exemplary Embodiment

Effects of the present exemplary embodiment will now be described.

(1) Because the opening 11h exposes the recording unit 22 outside the housing 11, the user can use the opening 11h for maintenance of the recording unit 22. The near field communication sensor 61 is located between the opening surface of the opening 11h and the cover member 41. Thus, in the housing 11, an installation space for the opening 11h used for maintenance and the cover member 41 can also serve as an installation space for the near field communication sensor 61. Accordingly, installation of the near field communication sensor 61 in housing 11 can be prevented from affecting an appearance of the housing 11, since a new installation space for the near field communication sensor 61 need not be provided in the housing 11.

(2) The cover member 41 and the opening 11h are disposed on the upper wall 16 of the housing 11. Accordingly, when the user places the communication terminal on the upper wall 16 of the housing 11, data communication between the near field communication sensor 61 and the communication terminal is enabled while posture of the communication terminal is in a stable state. Accordingly, when data communication between the near field communication sensor 61 and the communication terminal is performed, the communication terminal can be prevented from falling out of the housing 11.

(3) The near field communication sensor 61 is disposed on the tray member 51. As such, the user can remove the tray member 51 from the housing 11 to space the near field communication sensor 61 from the opening 11h of the housing 11. Accordingly, the user can perform maintenance of the recording unit 22 by widely using the opening 11h of the housing 11, and thus work efficiency for the user can be improved.

(4) Because both the operating unit 33 and the near field communication sensor 61 are located biased in the width direction X from the center portion of the housing 11, the operating unit 33 and the near field communication sensor 61 are closer to each other in the housing 11. As such, a time difference can be decreased between an operation by the user for holding the communication terminal over the near field communication sensor 61, and an operation by the user for operating the operating unit 33. Accordingly, the work efficiency for the user can be improved.

(5) The operating unit 33 is present at a position not aligned with the near field communication sensor 61 in any direction of the width direction X different from the orthogonal direction C, and the depth direction Y different from the orthogonal direction C and the width direction X. In the housing 11, the operating unit 33 is not disposed on a space shifted in the width direction X, and on a space shifted in the depth direction Y with respect to the near field communication sensor 61. As a result, when the user holds the communication terminal over the near field communication sensor 61, the operating unit 33 is less likely to be hidden by the communication terminal. Accordingly, operability of the operating unit 33 for the user can be improved.

(6) The cover member 41 can rotationally move with the cover end portion 41a of the cover member 41 as the rotation axis, to be movable to the opening position for opening the opening 11h and to the closing position for closing the opening 11h. The near field communication sensor 61 includes the wiring 61a that extends from the near field communication sensor 61 toward the cover end portion 41a. Thus, as the cover member 41 opens or closes, the wiring 61a of the near field communication sensor 61 can be prevented from being sandwiched between the cover member 41 and the housing 11.

(7) The cover member 41 is transmissive. The near field communication sensor 61 is visible to the user with the cover member 41 closing the opening 11h. Thus, with the cover member 41 closing the opening 11h, the user can check that the near field communication sensor 61 is attached to the housing 11. Accordingly, there is no need to dispose a notification unit in the recording device 10 that notifies the user that the near field communication sensor 61 is attached to the housing 11.

The exemplary embodiment described above may be modified as follows. The exemplary embodiment described above and modified examples thereof to be described below may be implemented in combination within a range in which a technical contradiction does not arise.

The cover member 41 and the opening 11h may be disposed on the side wall 17 of the housing 11.

Figure 10:
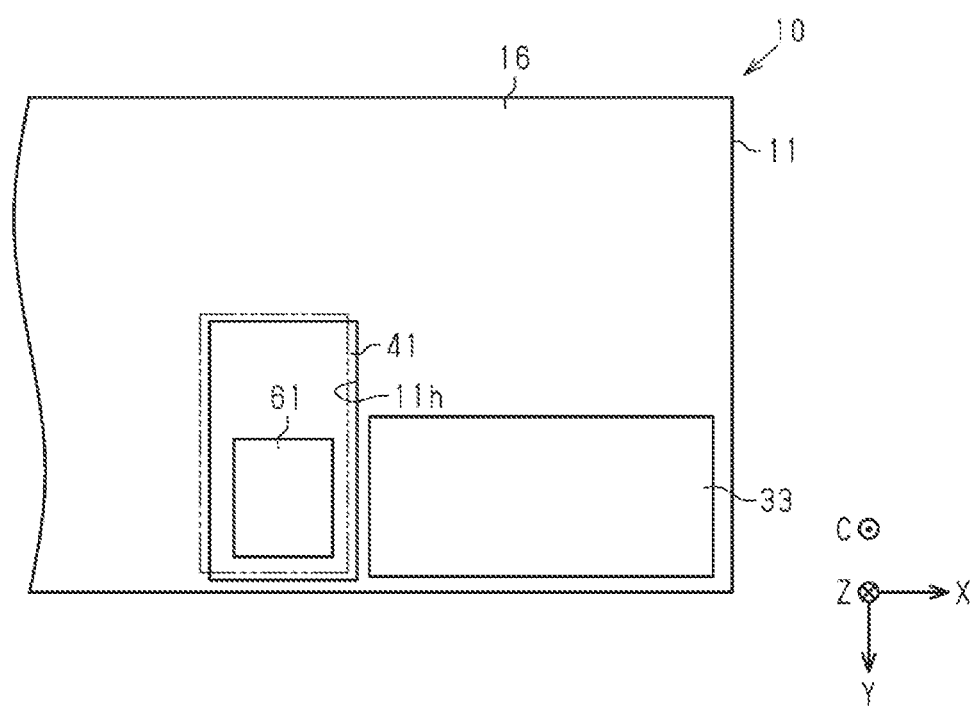
FIG. 10 is a schematic view for explaining a positional relationship between an operating unit and a near field communication sensor in another example.
Figure 11:
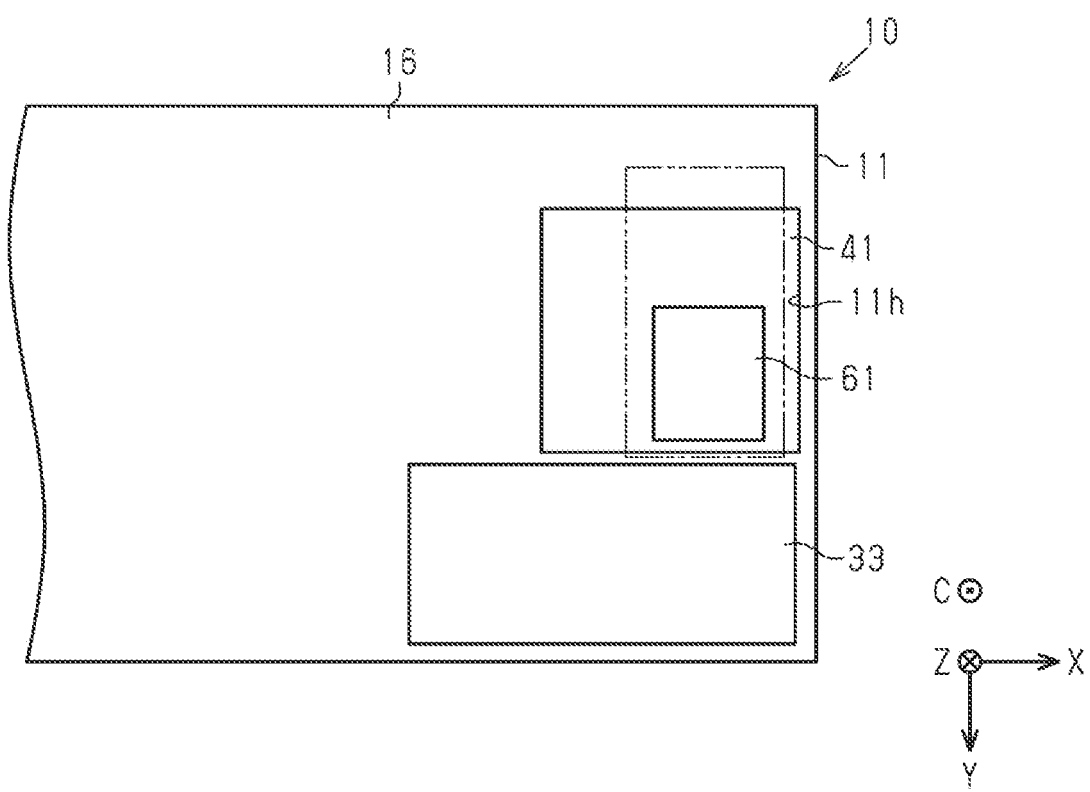
FIG. 11 is a schematic view for explaining a positional relationship between an operating unit and a near field communication sensor in yet another example.

As illustrated in FIG. 10, the operating unit 33 may be aligned with the near field communication sensor 61 in the width direction X different from the orthogonal direction C. As illustrated in FIG. 11, the operating unit 33 may be aligned with the near field communication sensor 61 in the depth direction Y different from the orthogonal direction C and the width direction X. In other words, the operating unit 33 may be aligned with the near field communication sensor 61 in one direction of the width direction X and the depth direction Y. Note that, in each of FIGS. 10 and 11, a disposition region of the communication terminal is illustrated by a two-dot chain line.

According to the modified examples described above, the following effects can be achieved in addition to the effects of (1) to (4), (6), and (7) of the exemplary embodiment described above.

(8) The operating unit 33 is aligned with the near field communication sensor 61 in one direction of the width direction X and the depth direction Y. As a result, when the user holds the communication terminal over the near field communication sensor 61, the communication terminal can be aligned with the operating unit 33, and thus the operating unit 33 is less likely to be hidden by the communication terminal. Accordingly, operability of the operating unit 33 for the user can be improved.

The near field communication sensor 61 may be attached to the cover inner surface 41u facing the opening 11h in the cover member 41.

According to the modified example described above, the following effects can be achieved in addition to the effects of the exemplary embodiment described above and the modified examples described above.

(9) The near field communication sensor 61 is attached to the cover inner surface 41u facing the opening 11h in the cover member 41. As such, because the near field communication sensor 61 is displaced with the cover member 41, opening or closing of the cover member 41 can move the near field communication sensor 61. Thus, apart from an operation for bringing the cover member 41 into an open state, an operation by the user for moving the near field communication sensor 61 is unnecessary, so a work load on the user can be reduced.

In the above modified example, the tray member 51 may be attached to the cover inner surface 41u, and the near field communication sensor 61 may be accommodated in the tray member 51, to attach the near field communication sensor 61 to the cover inner surface 41u. In the above modified example, the near field communication sensor 61 itself may be attached to the cover inner surface 41u without attaching the tray member 51 to the cover inner surface 41u.

The disposition of the tray member 51 on the housing 11 may be omitted. In this case, the near field communication sensor 61 is disposed on the housing 11 without being disposed on the tray member 51.

In the width direction X, the operating unit 33 may be disposed on one side with the center portion of the housing 11 interposed, and the near field communication sensor 61 may be disposed on another side.

The wiring 61a of the near field communication sensor 61 may extend from the near field communication sensor 61 so as to be away from the cover end portion 41a of the cover member 41.

The opening or closing operation of the opening 11h by the cover member 41 is not limited to rotationally moving with the cover end portion 41a of the cover member 41 as the rotation axis. For example, the cover member 41 may be configured to be removable from the housing 11. In this case, the cover member 41 is removed from the housing 11 by the user to open the opening 11h. The cover member 41 is attached to the housing 11 by the user to close the opening 11h.

The cover member 41 need not be transmissive. In this case, a notification unit may be disposed in the recording device 10 that notifies the user of whether the near field communication sensor 61 is disposed in the housing 11 or not. The user can check the disposition of the near field communication sensor 61 in the housing 11 without visually recognizing the near field communication sensor 61 disposed in the housing 11 by checking the notification unit.

A processing unit other than the recording unit 22 may be exposed to the exterior of the housing 11 through the opening 11h. Examples of the processing unit in this modified example include the feeding unit 26, the transport unit 28, and the control unit 29. Also, a cutter for cutting roll paper or the like, and a waste liquid tank for accommodating liquid removed from the nozzle surface 25b by maintenance, and the like can also be employed as the processing unit.

The cover member 41, the near field communication sensor 61, the tray member 51, and the operating unit 33 in the exemplary embodiment described above and the modified examples described above can also be employed in processing devices other than the recording device 10. In this case, the processing unit is disposed inside the housing 11. The processing unit is exposed to the exterior of the housing 11 through the opening 11h. The user can use the opening 11h for maintenance of the processing unit. In this modification example, effects similar to those in the above-described exemplary embodiment and modified examples can also be achieved. Note that, examples of the combination of the processing device and the processing unit in this modified example include the following combinations. In other words, the processing device may be a projector, and the processing unit may be a lamp. The processing device may be a printer or a post-processor installed with a printer, and the processing unit may be a cutter for cutting roll paper or the like. The processing device may be a scanner for moving and reading a target object such as paper, and the processing unit may be a roller for feeding the target object.

The recording device 10 may be a liquid jet device that jets or discharges other liquid other than ink and performs recording. Examples of a state of the liquid discharged from the liquid jet device as a small amount of droplets include granules, tears, and string-like tails. As the liquid described herein, it is sufficient that a material that can be jetted from the liquid jet device is used. For example, it is sufficient that the liquid is a substance in a state of a liquid phase, and examples include fluid bodies such as a liquid body with high or low viscosity, sol, gel water, other inorganic solvents, organic solvents, solutions, liquid resins, liquid metals, and metallic melts. Examples of the liquid include not only liquid as one state of a substance, but also particles of functional material consisting of solid substances such as pigments or metal particles dissolved, dispersed, or mixed in a solvent. Representative examples of the liquid include inks, liquid crystals, and the like described in the exemplary embodiment described above. Here, the ink includes various liquid compositions such as a general aqueous ink and a solvent ink, a gel ink, or a hot-melt ink. Specific examples of the liquid jet device include, for example, a device that jets liquid including materials such as an electrode material and a color material used in manufacture of liquid crystal displays, electroluminescent displays, surface emitting displays, color filters, and the like in a dispersed or dissolved form. The liquid jet device may be a device that jets bioorganic substances used for biochip manufacturing, a device used as a precision pipette and jetting liquid to be a sample, a printing apparatus, a micro dispenser, or the like. The liquid jet device may be a device jetting lubricant to a precision machine such as a clock or a camera in a pinpoint manner, and a device jetting transparent resin liquid such as ultraviolet cure resin or the like on a substrate for forming a tiny hemispherical lens, an optical lens, or the like used for an optical communication element and the like. The liquid jet device may be a device that jets an etching solution, such as acid or alkali, to etch a substrate or the like.

Hereinafter, technical concepts and effects thereof that are understood from the above-described exemplary embodiments and modified examples will be described.

(A) A processing device includes a housing, a processing unit disposed inside the housing, a cover member configured to cover an opening located in the housing in an openable and closeable manner, and a near field communication sensor disposed in the housing, wherein the processing unit is exposed to an exterior of the housing through the opening, and the near field communication sensor is, with the opening closed by the cover member, located between the opening surface and the cover member in an orthogonal direction orthogonal to an opening surface of the opening.

According to this configuration, the opening exposes the processing unit to an exterior of the housing, so a user can use the opening for maintenance of the processing unit. The near field communication sensor is located between the opening surface of the opening and the cover member. Thus, in the housing, an installation space for the opening used for maintenance and the cover member can also serve as an installation space for the near field communication sensor. Accordingly, installation of the near field communication sensor in housing can be prevented from affecting an appearance of the housing, since a new installation space for the near field communication sensor need not be provided in the housing.

(B) In a processing device, the cover member and the opening may be disposed on an upper wall of the housing.

According to this configuration, when the user places the communication terminal on the upper wall of the housing, data communication between the near field communication sensor and the communication terminal is enabled while posture of the communication terminal is in a stable state. Accordingly, when data communication between the near field communication sensor and the communication terminal is performed, the communication terminal can be prevented from falling out of the housing.

(C) In a processing device, the cover member and the opening may be disposed on a side wall of the housing.

(D) In a processing device, a tray member that overlaps the opening from outside the housing and is detachably disposed on the housing may be provided, and the near field communication sensor may be disposed on the housing via the tray member.

According to this configuration, the user can remove the tray member from the housing to space the near field communication sensor from the opening of the housing. Accordingly, the user can perform maintenance of the processing unit by widely using the opening of the housing, and thus work efficiency for the user can be improved.

(E) A processing device may include an operating unit disposed on the housing and operated by a user, and the operating unit and the near field communication sensor may be disposed shifted in a width direction from a center portion of the housing in the width direction different from the orthogonal direction.

According to this configuration, because both the operating unit and the near field communication sensor are located biased in the width direction from the center portion of the housing, so that the operating unit and the near field communication sensor are closer to each other in the housing. As such, a time difference can be decreased between an operation by the user for holding the communication terminal over the near field communication sensor, and an operation by the user for operating the operating unit. Accordingly, the work efficiency for the user can be improved.

(F) A processing device may include an operating unit disposed on the housing and operated by a user, and the operating unit may be present at a position that is not aligned with the near field communication sensor in any direction of a width direction different from the orthogonal direction and a depth direction different from the orthogonal direction and the width direction.

According to this configuration, in the housing, the operating unit is not disposed on a space shifted in the width direction, and a space shifted in the depth direction with respect to the near field communication sensor. As a result, when the user holds the communication terminal over the near field communication sensor, the operating unit is less likely to be hidden by the communication terminal. Accordingly, operability of the operating unit for the user can be improved.

(G) A processing device may include an operating unit disposed on the housing and operated by a user, and the operating unit may be aligned with the near field communication sensor in any one direction of a width direction different from the orthogonal direction and a depth direction different from the orthogonal direction and the width direction.

According to this configuration, the operating unit is aligned with the near field communication sensor in one direction of the width direction and the depth direction. As a result, when the user holds the communication terminal over the near field communication sensor, the communication terminal can be aligned with the operating unit, and thus the operating unit is less likely to be hidden by the communication terminal. Accordingly, operability of the operating unit for the user can be improved.

(H) In a processing device, the near field communication sensor may be attached to an inner surface of the cover member facing the opening.

According to this configuration, because the near field communication sensor is displaced with the cover member, opening or closing of the cover member can move the near field communication sensor. Thus, apart from an operation for bringing the cover member into an open state, an operation by the user for moving the near field communication sensor is unnecessary, so a work load on the user can be reduced.

(I) In a processing device, the cover member may rotationally move with an end portion of the cover member as a rotation axis, to be movable to an opening position for opening the opening and to a closing position for closing the opening, and the near field communication sensor may include wiring extending from the near field communication sensor toward the end portion.

According to this configuration, as the cover member opens or closes, the wiring of the near field communication sensor can be prevented from being sandwiched between the cover member and the housing.

(J) In a processing device, the cover member may be transmissive, and the near field communication sensor may be visible to a user with the opening closed by the cover member.

According to this configuration, with the opening closed by the cover member, the user can check that the near field communication sensor is attached to the housing. Accordingly, there is no need to dispose a notification unit in the processing device that notifies the user that the near field communication sensor is attached to the housing.

(K) A recording device includes a housing, a recording head configured to perform scanning in a scanning direction different from a transport direction of a recording medium to perform recording, a maintenance member disposed inside the housing, and used for maintenance of the recording head, a cover member configured to cover an opening located in the housing in an openable and closeable manner, and a near field communication sensor disposed in the housing, wherein the maintenance member is exposed to an exterior of the housing through the opening, and the near field communication sensor is, with the opening closed by the cover member, located between the opening surface and the cover member in an orthogonal direction orthogonal to an opening surface of the opening.

According to this configuration, the same effect as the processing device described above can be obtained.

What is claimed is:

1. A processing device, comprising:
   a housing;
   a processing unit disposed inside the housing, the processing unit being configured to move along a first movement path and discharge a liquid towards a medium;
   a cover member configured to cover openably and closably an opening extending through an upper wall of the housing and a peripheral wall portion, the opening being disposed vertically above the first movement path to vertically overlap the first movement path when viewed in a vertical direction, the peripheral wall portion is located farther in the vertical direction than a portion of the upper wall other than the peripheral wall portion to form a recess configured to receive the cover, the opening being bounded by the peripheral wall portion;
   another cover member configured to cover openably and closably a second opening extending through the upper wall of the housing, the second opening being disposed vertically above the first movement path to vertically overlap the first movement path when viewed in the vertical direction;
   a near field communication sensor disposed at the housing;
   a tray member that vertically overlaps the opening and the first movement path from outside the housing, is detachably disposed at the housing with a portion of the tray member disposed within the opening and extending vertically downward in the vertical direction towards the first movement path, and holds the near field communication sensor so that the near field communication sensor is disposed inside the housing, wherein
   the processing unit is exposed to an exterior of the housing through the opening with removing the tray member which is holding the near field communication sensor,
   the near field communication sensor held by the tray member is, with the opening closed by the cover member, located in a position arranged between a virtual plane having, and containing, an opening edge of the housing at the opening as a periphery of the virtual plane and the cover member in an orthogonal direction orthogonal to the virtual plane,
   with the cover member closed and the near field communication sensor being held by the tray, an outer surface of the cover member and a region of an upper surface of the housing other than the cover member are flush, and
   the tray member comprises a base wall, an extending wall extending from the base wall, and a notch disposed in the base wall and the extending wall, wherein with the tray member disposed at the housing, and with the portion of the tray member disposed within the opening, the base wall overlaps the opening from outside the housing to close a portion of the opening with the extending wall extending into the opening and the base wall and the notch being disposed below an opening surface of the opening formed by the peripheral wall portion.

2. The processing device according to claim 1, comprising:
   an operating unit disposed at the housing and operated by a user, wherein
   the operating unit and the near field communication sensor are disposed shifted in a width direction, different from the orthogonal direction, from a center portion of the housing in the width direction.

3. The processing device according to claim 1, comprising:
   an operating unit disposed at the housing and operated by a user, wherein
   the operating unit is present at a position that is not aligned with the near field communication sensor in any direction of a width direction different from the orthogonal direction and a depth direction different from the orthogonal direction and the width direction.

4. The processing device according to claim 1, comprising:
   an operating unit disposed at the housing and operated by a user, wherein
   the operating unit is aligned with the near field communication sensor in any one direction of a width direction different from the orthogonal direction, and a depth direction different from the orthogonal direction and the width direction.

5. The processing device according to claim 1, wherein the near field communication sensor is attached to an inner surface of the cover member facing the opening.

6. The processing device according to claim 1, wherein the cover member is configured to move to an opening position for opening the opening and to a closing position for closing the opening, by rotationally moving with an end portion of the cover member as a rotation axis, and the near field communication sensor includes wiring extending from the near field communication sensor toward the end portion.

7. The processing device according to claim 1, wherein the cover member is transmissive, and the near field communication sensor is visible by a user with the opening closed by the cover member.

* * * * *